United States Patent

Moulton et al.

[15] 3,669,225

[45] June 13, 1972

[54] VEHICLE SUSPENSION UNIT

[72] Inventors: Alexander Eric Moulton; Harold Harman, both of Bradford-on-Avon, England

[73] Assignee: Moulton Developments Limited, Bradford-on-Avon, Wiltshire, England

[22] Filed: Jan. 22, 1971

[21] Appl. No.: 108,760

[30] Foreign Application Priority Data

Jan. 30, 1970 Great Britain ..................... 4,624/70

[52] U.S. Cl. .......................................... 188/298, 188/322
[51] Int. Cl. .................................................. F16f 9/08
[58] Field of Search ........................... 188/298, 322; 74/18.2

[56] References Cited

UNITED STATES PATENTS 3,330,422    7/1967    Rasmussen .......................... 188/298

FOREIGN PATENTS OR APPLICATIONS

| 443,927 | 10/1912 | France | 188/298 |
| 978,479 | 4/1951 | France | 188/298 |
| 6,502,673 | 9/1965 | Netherlands | 188/322 |

*Primary Examiner*—Evon C. Blunk
*Attorney*—Shoemaker & Mattare

[57] ABSTRACT

The invention provides a diaphragm-type hydraulic displacer unit of the kind which includes a piston-like member arranged to move inwardly and outwardly of a cylinder-like member, the annular gap between the piston and cylinder being bridged by a flexible diaphragm and in which during operation the ratio between the maximum stroke of which the unit is capable and the maximum effective bore of the diaphragm, occurring in operation, is at least 1.2 : 1, and may be 2 : 1 or more, and in which during all operative conditions the pressure across the unsupported diaphragm loops exceeds 100 pounds per square inch.

The invention is concerned with ensuring longevity of the diaphragm in such a unit and provides that the unit shall have the following features in combination:

a. the flared flanks of the piston and the inner wall of the cylinder skirt are tapered in opposite directions such that over the maximum stroke permitted in operation, the effective bore of the diaphragm increases as the piston moves inwardly of the cylinder and such that the dimension of the effective bore of the diaphragm, when the piston is in its innermost position is between 15 percent and 25 percent greater than the dimension of the effective bore of the diaphragm when the piston is in the outermost position of its permitted stroke;

b. the piston flanks and the inner wall of the skirt are so constructed that the ratio between the effective bore of the diaphragm and the loop radius of the diaphragm will always be greater than 11 : 1 throughout the permitted stroke, with the loop radius being maintained substantially constant within 10 percent throughout the permitted stroke;

c. that the diaphragm is initially moulded in the shape which it would be forced to adopt when the piston is advanced to a position further into the cylinder than would be occasioned during its normal operation in the permitted stroke;

d. the cord reinforcement of the diaphragm consists of at least two plies having a bias angle of between 30° and 50° inclusive;

e. the thickness of the diaphragm is such that the ratio between the loop radius of the diaphragm and the thickness of the diaphragm is always greater than 2 : 1 throughout the permitted stroke.

4 Claims, 4 Drawing Figures

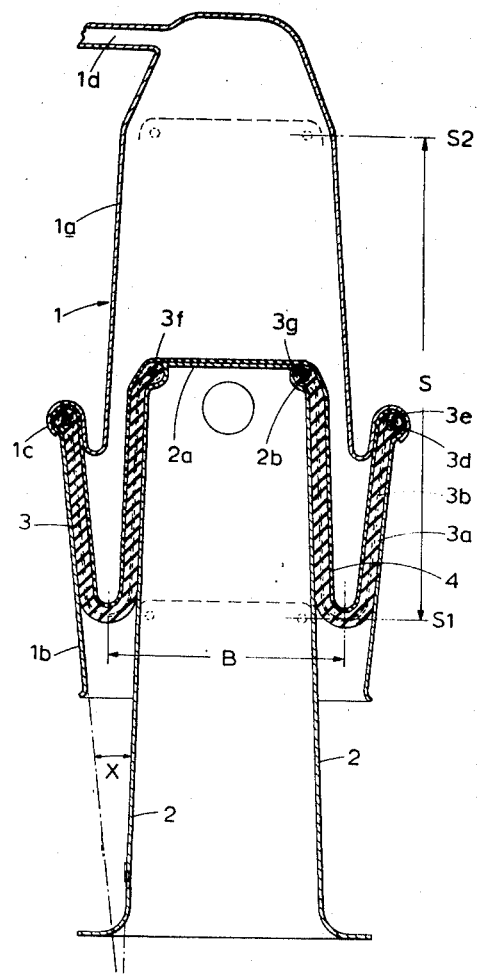

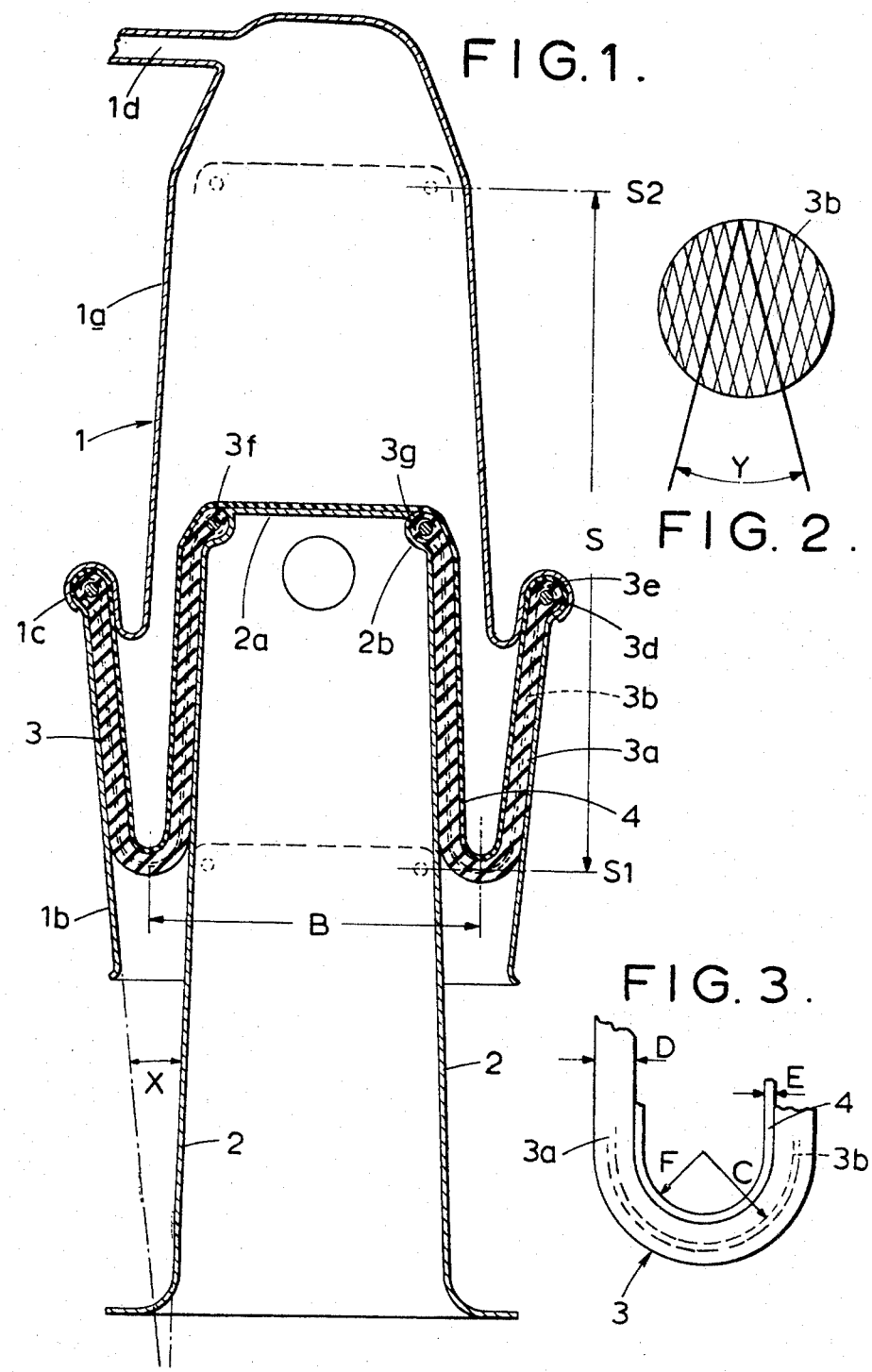

VEHICLE SUSPENSION UNIT

This invention relates to diaphragm-type hydraulic displacer units.

There are applications in engineering, especially in vehicle suspension systems where it is advantageous to render fluid displacement systems hermetically sealed by the use of impermeable diaphragms.

For example, in our prior British Pat. No. 828,607, we have described a diaphragm type hydraulic displacer unit in which the diaphragm is required to have the ability to sustain a long stroke in relation to its effective bore.

This invention relates to a diaphragm-type hydraulic displacer unit of the general type described in the aforementioned British Pat. No. 828,607, an example of which is shown in FIGS. 1 to 3 of the accompanying drawings which will now be described so that the invention will be more readily understood.

In the drawings, FIG. 1 is a purely diagrammatic cross-sectional side view of a diaphragm-type displacer unit;

FIG. 2 is a detail view to greater scale than FIG. 1 illustrating the cord reinforcement applied to diaphragms of the kind in question.

FIG. 3 is a detail view to enlarged scale of the loop region of the diaphragm in cross section.

Figure 4:
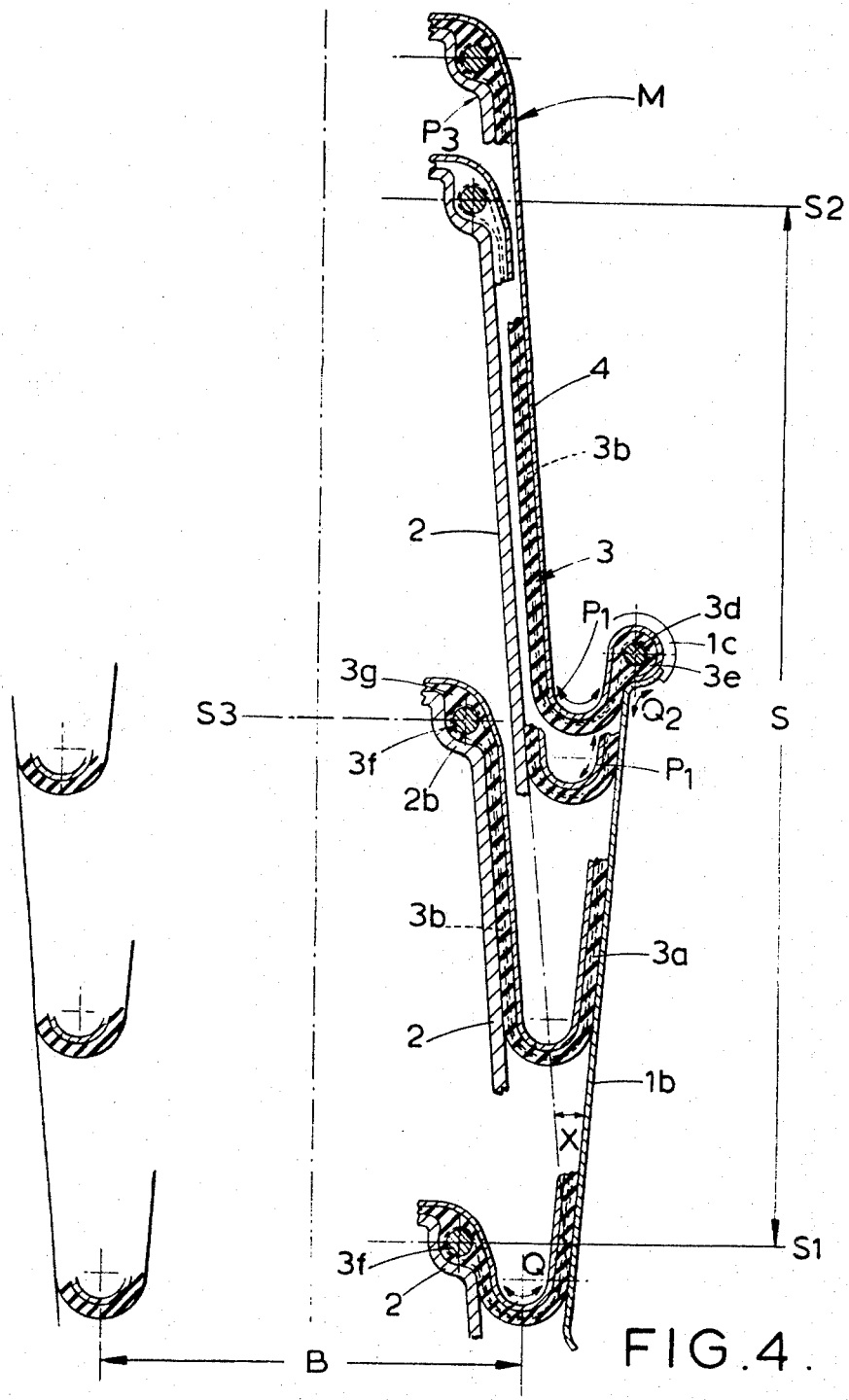
FIG. 4 shows an enlarged view of the diaphragm in various positions.

In FIG. 1, 1 generally represents a composite member being an analogue of a cylinder and 2 represents a piston-like member having outwardly flared flanks and 3 generally represents a flexible diaphragm bridging the annular gap between the piston 2 and the cylinder 1.

The cylinder and the diaphragm define a space filled with liquid under pressure such that the diaphragm sustains a substantial pressure difference across it.

The composite cylinder 1 is composed of a metal casing $1a$ having an open end. This open end is shaped and bent over to form a lip $1c$ which traps firstly a metal skirt member $1b$ which also forms part of the cylinder 1; secondly the bent over lip $1c$ at the open end of the cylinder traps the outer peripheral edge of the diaphragm generally designated 3; thirdly the lip $1c$ traps a liner 4.

The diaphragm 3 has a main body or septum $3a$ of rubber or like material which is reinforced especially in the region where it flexes in operation with a carcase of synthetic textile cords indicated at $3b$. All the reinforcement is embedded in the septum $3a$. The diaphragm 3 is rendered impermeable by providing on its face the liner 4 which may be of butyl rubber or neoprene.

At its outer periphery the diaphragm 3 is reinforced by a textile or steel annulus $3d$ to which is attached the cord reinforcement $3b$. The annulus $3d$ is embedded in a peripheral bead $3e$ which is homogeneous with the main septum of rubber or like material.

The central region of the diaphragm is reinforced by an inner textile or steel annulus $3f$ to which the reinforcement $3b$ is attached and this central annulus $3f$ is also embedded in a bead $3q$ which is homogeneous with the main body or septum $3a$.

The reinforcing cords $3b$ embedded in the septum $3a$ and extending from the outer annulus $3d$ to the inner annulus $3f$ and there are commonly at least two plies of these cords which as shown in FIG. 2, intersect one another at a certain angle known as the bias angle shown on FIG. 2 as Y. If the individual cords have a diameter of say 0.010 inch, there are commonly provided between 30 and 50 cords per linear inch.

The crown $2a$ of the piston 2 may be of flat shape as shown, or it may be of shallow concave, or shallow convex, shape. The crown is suitably covered by a thin membrane forming an extension of the main body of diaphragm 3 and by a central zone of the liner 4.

The inner annulus $3f$ is seated in an annular groove $2b$ surrounding the piston crown $2a$.

The piston, in operation, is intended to move into and out of the cylinder 1 over a stroke indicated in FIG. 1 at S, that is to say a distance between an outermost position indicated at S1 and an innermost position indicated at S2. During such movement the diaphragm rolls between the conically flared flanks $2c$ of the piston and the conically tapered inner wall of the skirt member $1b$, the conicity of the inner wall of the skirt $1b$ being in the opposite sense to that of the piston flanks $2c$ to an extent represented by a taper angle indicated at X.

Except for its unsupported pressure sustaining loops, the major part of the length of diaphragm 3 is supported by the piston flanks and the inner wall of the skirt $1b$ throughout the permitted stroke S and due to the opposite conical tapering of skirt $1b$ and the piston flanks $2c$ the effective bore of the diaphragm increases as the piston 2 moves inwardly of cylinder 1 and decreases when the piston moves in the opposite direction, without any significant change in the length of the diaphragm which is supported.

It is to be emphasized that the stroke S is the maximum stroke permitted to the piston, in operation. This will be limited, for example by stops or mechanical linkages which are not illustrated, so that the extreme positions past each end of the stroke where the whole of the diaphragm would be subjected to strain in linear tension, derived from forces other than those occasioned by the fluid pressure across it, are never reached or even closely approached.

The mean effective bore of the diaphragm 3 is the dimension measured diametrally to the centers of the unsupported pressure sustaining loops formed by the diaphragm as it rolls between the piston 2 and the skirt $1b$.

In FIG. 1, B represents this dimension measured diametrally between the centers of the loops of the diaphragm 3 and for the purpose of this specification the "maximum effective bore" of the diaphragm is defined as the maximum dimension of B, namely that reached when the piston moves into the cylinder 1 and adopts the extreme innermost position of the permitted stroke, S, indicated at S2.

The radius of the unsupported pressure sustaining loops is indicated at C in FIG. 3 of the drawings and extends between the center of curvature of the loops and the midpoint of the diaphragm thickness. This radius C will be dependent upon the shaping of the surfaces defining the annular gap between the piston and cylinder skirt.

Also in FIG. 3, D represents the thickness of the diaphragm, E the thickness of the liner and F the radius of the loop of the liner 4.

The space between the diaphragm 3 and the housing $1a$ is filled with hydraulic liquid and as the piston moves into or out of the cylinder 1, such liquid flows out of or into a port indicated at $1d$ formed in housing $1a$.

This invention relates, therefore, to diaphragm type displacer units of the kind which we have above defined with reference to FIG. 1 of the accompanying drawings.

The invention has for its object to ensure longevity in such a displacer unit wherein during operation the ratio between the maximum stroke 'S' of which the unit is capable and the maximum effective bore 'B' occurring in operation is at least 1.2 : 1 and may be 2 : 1 or more and in which during all operative conditions the pressure difference across the unsupported diaphragm loops exceeds 100 pounds per square inch.

It has been found that in order to ensure longevity in these conditions the construction of the diaphragm itself and of the components of the displacer units between which it is adapted to roll in operation, particularly so far as their shaping is concerned, requires to satisfy certain specific parameters.

According to this invention it is provided that in a diaphragm-type hydraulic displacer unit of the kind hereinabove described with reference to FIG. 1 :

a. firstly, the flared flanks of the piston and the inner wall of the cylinder skirt are tapered in opposite directions such that over the maximum stroke S permitted in operation, the effective bore B increases as the piston moves inwardly of the cylinder and such that the dimension of the effective bore B, when the piston is in its innermost position is between 15 percent and 25 percent greater than the dimension of B when the piston is in the outermost position of its permitted stroke S;

b. secondly, the piston flanks and the inner wall of the skirt are so constructed that the ratio between the bore B and the loop radius C of the diaphragm 3 will always be greaterthan 11 : 1 throughout the stroke S, with the loop radius C being maintained substantially constant with 10 percent throughout the stroke S;

c. thirdly, that the diaphragm is initially moulded in the shape which it would be forced to adopt when the piston is advanced to a position further into the cylinder than would be occasioned during its normal operation in the permitted stroke S;

d. fourthly, the cord reinforcement of the diaphragm consists of at least two plies having a bias angle Y of between 30° and 50° inclusive; and e. fifthly, the thickness of the diaphragm is such that the ratio between the loop radius C of the diaphragm 3 and the thickness D of the diaphragm 3 is always greater than 2 : 1 and is preferably between 2.5 : 1 and 3 : 1.

Preferably the ratio between the loop radius F of the liner 4 and the thickness E of the liner is always in excess of 3.5 : 1 and preferably 4 : 1 or more.

Due to these parameters the strains imposed upon the liner 4 and on the reinforcement 3b of the diaphragm 3 are kept at an acceptable level. It has been found that displacer units constructed in accordance with these requirements can accomplish so many cycles, over a full stroke S which is at least 1.2 times as great as the maximum effective bore B encountered during such stroke, and when the pressure across the diaphragm exceeds 100 pounds per square inch, that an adequate degree of longevity is achieved.

The piston flanks and the inner wall of the skirt are preferably true conical and oppositely tapered with the difference in taper angle X between the flanks of the piston and the inner wall of the cylinder skirt amounting to between 7° and 13°.

One embodiment of the present invention will now be described by way of example with reference to FIG. 4 of the accompanying drawings.

This drawing is a transverse cross-sectional side view of the relevant parts of a long-stroke diaphragm-type hydraulic displacer showing various positions of the diaphragm and of the components between which it rolls.

In FIG. 4 similar reference numerals are employed for parts analogous to those which have already been described with reference to FIGS. 1 to 3 of the drawings.

In FIG. 4, 3 again generally represents a diaphragm adapted to roll between oppositely tapered surfaces, firstly, of a piston 2 and secondly, of a skirt 1b forming part of the composite cylinder of an hydraulic displacer unit.

The piston 2 is adapted to move inwardly of the cylinder over a stroke S from an outermost permitted position indicated at S1 to an innermost permitted position indicated at S2. The median position of the stroke is indicated at S3. The effective bore of the diaphragm is again indicated at B and has the dimension measured diametrally between the centers of the unsupported pressure sustaining loops of the diaphragm.

According to a first feature of the invention, the flared flanks of the piston 2 and the inner wall of the cylinder skirt 1b are tapered in opposite directions and are so shaped that over a maximum stroke S permitted in operation, the effective bore B increases as the piston moves inwardly of the cylinder such that the dimension of bore B when the piston is in its innermost permitted position at S2, is between 15 percent and 25 percent greater than the dimension of B when the piston 2 is in the outermost position S1 of its permitted stroke S.

As shown in the drawings, the flanks of piston 2 and the inner wall of the skirt are true conical and are oppositely tapered with the difference in taper angle X between the flanks of piston 2 and the inner wall of the cylinder skirt 1b amounting to 10°. Indeed the included cone angle of the piston flanks is 11° and the included cone angle of the inner wall of cylinder skirt 1b is 9° in the drawing. Hence in the arrangement shown the effective bore B when the piston 2 is at position S2 is approximately 20 percent greater than the bore B when the piston 2 is in position S1 of its permitted stroke S.

In the arrangement shown in FIG. 4 the stroke S is more than two times as great as the maximum dimension of bore B, namely that achieved when the piston is at position S2.

We have previously identified with reference to FIG. 3 the loop radius C of the diaphragm. According to a second feature of this invention the flanks of the piston 2 and the inner wall of the skirt 1b are so constructed that the ratio between the bore B and the loop radius C of the diaphragm 3 will always be greater than 11 : 1 throughout the stroke S and it will be noted that the loop radius C will be maintained substantially constant within 10 percent throughout the stroke S.

A further feature according to the invention is that the diaphragm shall be reinforced by at least two plies of reinforcing cords indicated at 3b and we have previously shown with reference to FIG. 2 that these cords intersect one another at a bias angle Y. According to the invention the angle Y is between 30° and 50° inclusive.

We have previously defined with reference to FIG. 3 the thickness D of the diaphragm 3 and according to the invention the ratio between the loop radius C and the thickness D of the diaphragm is always greater than 2 : 1 throughout the stroke S. The diaphragm again has a liner 4 having a thickness E and according to the invention it is preferred that the ratio between the loop radius F of the liner 4 and the thickness E is always in excess of 3.5 : 1.

A final and essential feature of the invention is that the diaphragm 3 is initially moulded in the shape which it would be forced to adopt if the piston 2 were advanced to a position further into the cylinder than would be occasioned during its normal operation in its permitted stroke S.

The moulded shape of the diaphragm is indicated at M in FIG. 4.

The reason for adopting the shape indicated at M in the moulding process will now be briefly described.

In the manufacture of diaphragms the reinforcing cords 3b are first connected to the inner and outer reinforcing annuli 3d and 3f. An appropriate bias angle Y is imparted to the cords and they are then placed in a forming mould, the rubber or analogous material intended to constitute the septum 3a of the diaphragm is then entered into the mould to embed the reinforcing cords.

When the cords lie in the mould it is not practical to maintain the cords in spaced relation from sharply radiused corners of the mould.

For example, if the diaphragm were to be moulded in the shape which it adopts when the piston is at stroke position S1 the cords 3b would lie near the surface of the shaping mould at regions Q1 and Q2 indicated in FIG. 4 of the drawings. It will be noted that region Q1 is a region of the diaphragm which is unsupported and pressure sustaining during the permitted stroke S of the piston. There is, therefore, a danger that during operation the fluid pressure across the diaphragm will tend to urge the rubber septum 3a away from its reinforcement 3b and that the exposed cords will abrade the liner 4.

If, however, as provided according to the invention, the diaphragm is moulded in a position indicated at M in FIG. 4, the cords 3b will lie close to the walls of the forming mould in the region extending from the outer annulus 3d to a point approximately indicated at P1 in FIG. 4.

The cords will also lie close to the walls of the forming mould at a position indicated at P3 in FIG. 4. However, it will be noted that during the operative stroke S of the displacer unit, the regions of the diaphragm extended between the outer annulus 3d and the point P1 will be supported by the inner wall of the skirt 1b while the region of the diaphragm indicated at P3 will be supported by the piston 2.

As a consequence, if the diaphragm is moulded in the position indicated at M, at no time during its permitted stroke will regions of the diaphragm in which the reinforcing cords lie close to the surface of the diaphragm be unsupported either by the piston or by the cylinder skirt 1b.

It will be appreciated that this is an important factor in ensuring longevity of diaphragms which in practice sustain pressure which may be considerably in excess of 100 pounds per square inch across their unsupported loops.

It will be noted that during operation in the permitted stroke S and particularly at the extreme limits of stroke S, certain portions of the diaphragm and of the liner are subjected to circumferential strains through having to roll between the flanks of the piston 2 and the inner wall of the skirt 1b. However, if the teaching of the invention is followed and the parameters defined above relating to the shaping and construction of the piston flanks of the skirt 1b and of the diaphragm 3 are followed, the strains imposed in operation upon the liner, upon the diaphragm and upon its reinforcement are kept at an acceptable level.

Practical tests have proved that displacer units according to the invention have fully adequate degrees of longevity when operating at a stroke S considerably in excess of the maximum dimension of bore B and when the pressure across the unsupported loops of the diaphragm exceeds 100 pounds per square inch throughout the permitted stroke S. Indeed it will be appreciated that in the case where the pressure across the loops substantially exceeds 100 pounds per square inch when the piston is in the position S1 of its stroke S, then the pressure will be much higher and may be between 300 and 400 pounds per square inch when the piston is in the innermost position S2 of its permitted stroke S.

We claim:

1. A diaphragm-type hydraulic displacer unit which includes a piston-like member arranged to move inwardly and outwardly of a cylinder-like member, the annular gap between the piston and cylinder being bridged by a flexible diaphragm and in which during operation the ratio between the maximum stroke of which the unit is capable and the maximum effective bore of the diaphragm, occurring in operation, is at least 1.2 : 1, and may be 2 : 1 or more, and in which during all operative conditions the pressure across the unsupported diaphragm loops exceeds 100 pounds per square inch, characterized by the following features in combination:

a. the flared flanks of the piston and the inner wall of the cylinder skirt are tapered in opposite directions such that over the maximum stroke permitted in operation, the effective bore of the diaphragm increases as the piston moves inwardly of the cylinder and such that the dimension of the effective bore of the diaphragm, when the piston is in its innermost position is between 15 percent and 25 percent greater than the dimension of the effective bore of the diaphragm when the piston is in the outermost position of its permitted stroke;

b. the piston flanks and the inner wall of the skirt are so constructed that the ratio between the effective bore of the diaphragm and the loop radius of the diaphragm will always be greater than 11 : 1 throughout the permitted stroke, with the loop radius being maintained substantially constant within 10 percent throughout the permitted stroke;

c. that the diaphragm is initially moulded in the shape which it would be forced to adopt when the piston is advanced to a position further into the cylinder than would be occasioned during its normal operation in the permitted stroke;

d. the cord reinforcement of the diaphragm consists of at least two plies having a bias angle of between 30° and 50° inclusive;

e. the thickness of the diaphragm is such that the ratio between the loop radius of the diaphragm and the thickness of the diaphragm is always greater than 2 : 1 through the permitted stroke.

2. A diaphragm-type hydraulic displacer unit according to claim 1, wherein the ratio between the loop radius of the diaphragm and the thickness of the diaphragm is between 2.5 : 1 and 3 : 1 throughout the permitted stroke.

3. A diaphragm-type hydraulic displacer unit according to claim 1 wherein there is provided on the inner side of the diaphragm an impermeable liner whose thickness is such that the ratio between the thickness of the liner and the radius of curvature of the liner in the region of the unsupported loops of the diaphragm is always in excess of 3.5 : 1 throughout the permitted stroke of the piston.

4. A diaphragm-type hydraulic displacer unit according to claim 1 wherein the piston flanks and the inner wall of the cylinder skirt are true conical and oppositely tapered with the difference in taper angle between the flanks of the piston and the inner wall of the cylinder skirt amounting to between 7° and 13°.

* * * * *